(12) United States Patent
Krishnaswamy et al.

(10) Patent No.: US 9,417,931 B2
(45) Date of Patent: Aug. 16, 2016

(54) UNIFIED METADATA FOR EXTERNAL COMPONENTS

(75) Inventors: Raja Krishnaswamy, Redmond, WA (US); Shrikrishna V. Borde, Redmond, WA (US); Michael Shneerson, Redmond, WA (US); Samuel Ng, Bellevue, WA (US); Timothy Ng, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1464 days.

(21) Appl. No.: 12/144,724

(22) Filed: Jun. 24, 2008

(65) Prior Publication Data
US 2009/0319554 A1 Dec. 24, 2009

(51) Int. Cl.
G06F 17/30 (2006.01)
G06F 9/54 (2006.01)
G06F 9/44 (2006.01)

(52) U.S. Cl.
CPC ............... *G06F 9/541* (2013.01); *G06F 9/443* (2013.01)

(58) Field of Classification Search
None
See application file for complete search history.

(56) References Cited

U.S. PATENT DOCUMENTS

| | | | |
|---|---|---|---|
| 6,052,526 A | 4/2000 | Chatt | |
| 6,349,343 B1 * | 2/2002 | Foody et al. | 719/316 |
| 6,983,458 B1 * | 1/2006 | Honda | 717/151 |
| 7,010,791 B2 * | 3/2006 | Cierniak | 719/315 |
| 7,073,170 B2 | 7/2006 | Grier et al. | |
| 7,127,707 B1 | 10/2006 | Mishra et al. | |
| 7,210,132 B2 | 4/2007 | Rivard et al. | |
| 7,219,329 B2 | 5/2007 | Meijer et al. | |
| 7,219,330 B2 | 5/2007 | Hogg et al. | |
| 7,287,259 B2 | 10/2007 | Grier et al. | |
| 7,350,198 B2 | 3/2008 | Kluger et al. | |
| 7,415,706 B1 * | 8/2008 | Raju et al. | 717/170 |
| 8,539,496 B1 * | 9/2013 | Anand et al. | 718/104 |
| 2003/0033369 A1 | 2/2003 | Bernhard | |
| 2003/0101432 A1 * | 5/2003 | Allison | 717/114 |
| 2003/0131135 A1 * | 7/2003 | Yun | 709/249 |
| 2003/0131347 A1 * | 7/2003 | Allison | 717/165 |
| 2004/0044994 A1 * | 3/2004 | Bera | 717/136 |
| 2004/0049766 A1 | 3/2004 | Bloch et al. | |
| 2004/0064808 A1 * | 4/2004 | Kira | 717/154 |
| 2004/0107125 A1 | 6/2004 | Guheen et al. | |
| 2004/0194117 A1 * | 9/2004 | Schulte et al. | 719/328 |
| 2005/0114771 A1 | 5/2005 | Piehler et al. | |
| 2005/0278270 A1 * | 12/2005 | Carr et al. | 706/25 |
| 2006/0047974 A1 | 3/2006 | Alpern et al. | |
| 2006/0074733 A1 | 4/2006 | Shukla et al. | |
| 2006/0107271 A1 | 5/2006 | Irving et al. | |
| 2006/0174252 A1 | 8/2006 | Besbris et al. | |

(Continued)

OTHER PUBLICATIONS

"Visual Studio Tools for Office", pp. 1-18, Copyright: 2008.

(Continued)

*Primary Examiner* — Umut Onat
(74) *Attorney, Agent, or Firm* — Kevin Sullivan; Kate Drakos; Micky Minhas

(57) ABSTRACT

A system and method for facilitating execution of multiple assemblies in a framework, in which the assemblies use a component external to the framework, is provided. A runtime manager may retrieve metadata from each of the assemblies, and selectively insert the metadata into a unified types object, so that metadata corresponding to equivalent type definitions is shared. When each assembly is executed, the combined metadata may be used to invoke or otherwise interact with the external component.

18 Claims, 11 Drawing Sheets

(56) References Cited

U.S. PATENT DOCUMENTS

| 2006/0225026 | A1 | 10/2006 | Henaire et al. |
| 2006/0282817 | A1 | 12/2006 | Darst et al. |
| 2006/0288353 | A1 | 12/2006 | King et al. |
| 2007/0039010 | A1 | 2/2007 | Gadre |
| 2007/0255719 | A1 | 11/2007 | Baikov et al. |
| 2007/0256069 | A1 | 11/2007 | Blackman et al. |
| 2008/0002817 | A1 | 1/2008 | Ovsyannikov et al. |
| 2008/0005727 | A1 | 1/2008 | Morris |
| 2008/0127236 | A1* | 5/2008 | Beisiegel et al. ............. 719/331 |
| 2009/0055809 | A1* | 2/2009 | Campbell ..................... 717/140 |

OTHER PUBLICATIONS

Benton, et al. "Adventures in Interoperability: The SML.NET Experience", Proceedings of the 6th ACM SIGPLAN international conference on Principles and practice of declarative programming, Date: Aug. 24-26, 2004, pp. 215-226, ACM Press New York, NY, USA.

Jones, et al. "Team Development with Visual Studio .NET and Visual SourceSafe", Date: Jan. 2002, pp. 1-14, http://msdn2.microsoft.com/en-us/library/ms998215.aspx#tdlg_ch4_referencingcomobjects.

"Importing a Type Library as an Assembly", Copy Right: 2008, 2 Pages http://msdn2.microsoft.com/en-us/library/xwzy44e4.aspx.

"Interoperating with COM from .NET Applications (COM Interop)", Copy Right: 2002-2008, 4 Pages http://www.beansoftware.com/NET-Tutorials/COM-Interop.aspx.

"Primary Interop Assembly for MSHTML Increases Size of Redistributable File", Copy Right: 2008, 2 Pages http://support.microsoft.com/kb/305622.

Office Action issued in U.S. Appl. No. 12/144,743, on Sep. 29, 2011, 15 pages.

Office Action issued in U.S. Appl. No. 12/144,743, on May 19, 2014, 24 pages.

Office Action issued in U.S. Appl. No. 12/144,743, on Dec. 4, 2014, 33 pages.

Office Action issued in U.S. Appl. No. 12/144,743, on Nov. 23, 2015, 33 pages.

Office Action issued in U.S. Appl. No. 12/144,743, on Jun. 7, 2016, 33 pages.

* cited by examiner

UNIFIED METADATA FOR EXTERNAL COMPONENTS

CROSS-REFERENCE TO RELATED APPLICATIONS

The present invention is related to U.S. patent application entitled "Local Metadata For External Components," Ser. No. 12/144,743, filed concurrently herewith, the contents of which are hereby incorporated by reference herein.

TECHNICAL FIELD

The present invention relates generally to computer systems, and, more particularly, to the interoperation of software components between platforms.

BACKGROUND

Computer programs typically are made up of components called objects. An object may include both computer instructions and data. Objects of a program may invoke other objects within the program, or external components. An object may be designed to be used as an external component by a program, or by multiple programs. An object may be designed with a defined set of methods and data types, and perform in defined ways, to facilitate use by a variety of programs and programmers. An interface defines access to the object's public methods and data, including the behavior of the methods. With a well-defined interface, an object may be changed and continue to work for programs that invoke it, provided it conforms to the interface.

The Component Object Model (COM), produced by Microsoft Corporation of Redmond, Wash., is a software architecture for creating, communicating with, and using objects. A COM object may have one or more interfaces that expose its attributes and functionality to external components or applications. A software developer may use a COM object without needing to know many of the details of its implementation, and can rely on the interface even if the implementation changes in a future version. The COM architecture allows an object written in a programming language to be used by programs written in different programming languages. A developer of the other programs need not even know the language of the COM object.

A COM interface is a strongly-typed contract between the object and external programs. Each interface has a unique identifier, referred to as a globally unique identifier (GUID). If a COM object implements more than one interface, each interface has its own unique GUID. A GUID is typically a 128-bit integer number. A GUID facilitates correct connection between a COM object and a calling program. If a COM object is updated and requires one or more updated interfaces, each new one has a new corresponding GUID. According to the COM protocol, each new interface must be compatible with previous interfaces. They may add new methods or definitions, but do not change or delete older definitions.

A framework is a software architecture that facilitates sharing of services to applications that run within the framework. For example, a framework may provide services such as memory allocation and deallocation, user interface, exception handling, network communications, managing the lifetime of processes, or other such services. This type of framework may be referred to as a "managed framework," and programs that execute within such a framework may be referred to as "managed programs." The .NET framework, by Microsoft Corporation, is an example of such a framework. It provides a framework for application development and execution. The .NET framework includes a runtime environment known as the Common Language Runtime (CLR). The CLR manages programs within the framework, by locating and loading classes, handling references to objects and their methods, allocating and deallocating memory, and other runtime services. A framework may enable a software developer to develop programs using the framework as a platform, facilitating deployment on a variety of different computer systems.

To facilitate use of a COM object from a program in the .NET framework, an interop assembly may be used. An interop assembly is a bridging system that enables interaction between software objects across different architectures, such as the managed architecture of .NET and the unmanaged COM architecture. An interop assembly generally includes metadata that enables interaction between software objects. The metadata of an interop assembly corresponding to a COM object generally includes the interface definitions as well as other metadata that is exposed by the COM object and used by a managed program. The framework can use the metadata of an interop assembly to enable a managed program to use a COM object in a manner similar to using a managed component.

FIG. 1A illustrates a compile-time environment 100 having components from two different architectures. COM component 104 is a component that adheres to the COM architecture. COM component 104 is not a part of compile-time environment 100. It is shown in dashed lines to indicate a relation to compile time environment 100. Specifically, COM component 104 may be used as input to generate interop assembly 106 prior to compilation of application source code 110. As shown in FIG. 1B, COM component 104 may also be used at runtime.

Framework 108a is a platform with an architecture that facilitates and manages execution of programs or subprograms, and further facilitates compilation of programs to be managed. Application source code 110 is source code that is translated by compiler 112 into a managed application 114 that runs within framework 108b of FIG. 1B. Compiler 112 receives as input application source code 110 and interop assembly 106, generating managed application 114.

FIG. 1B illustrates a runtime environment 101, corresponding to compile-time environment 100 of FIG. 1A. Runtime environment 101 includes components from two different architectures. As discussed above, COM component 104 is a component that adheres to the COM architecture. It may be used by one or more computer programs, including programs within framework 108b and programs external to framework 108b. It has an associated VTable 120. Briefly, VTable 120 includes data that facilitates dynamic access to objects, methods, or data during runtime, by providing pointers. For example, VTable 120 may have a table with an entry for each method of the COM component. When an external component needs to invoke a method, it may retrieve, from the VTable, a pointer to the method, and use the pointer to reference the method.

Framework 108b is an architecture that facilitates and manages execution of programs or subprograms. It presents a different view of framework 108a of FIG. 1. Managed application 114 is a managed application that runs within framework 108b. Runtime manager 118 provides services to managed application 114, as discussed above. Runtime manager 118 receives metadata from interop assembly 106 and vtable 120 to facilitate referencing COM component 104.

Interop assembly 106 enables managed application 114 to invoke and use COM component 104. As discussed above, interop assembly 106 includes metadata, such as interface definitions, exposed by COM component 104. When managed application 114 invokes a method of COM component 104, interop assembly 106 may be used to locate and invoke the method. Runtime manager 118 may retrieve a pointer to the method from VTable 120.

In runtime environment 101, prior to executing managed application 114, or at least prior to the use of COM component 104 by managed application 114, interop assembly 106 is deployed, so that it may be used as discussed herein. There may be added complexity in a situation in which there are multiple versions of interop assembly 106, with respect to deploying a correct interop assembly. Further, interop assembly can be large, and deployment or runtime use can use up valuable storage or memory.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Briefly, a system, method, and components operate to generate and execute a computer program in a framework that accesses a component outside of the framework. A program generator retrieves metadata from an assembly associated with the external component and combines the metadata with the computer program so that the metadata has a scope that is local to the computer program. At run time, the program may reference the external component by using the merged metadata. The program does not need to reference the assembly at run time.

A system may include a compiler that translates source code of the computer program into compiled code. The compiled code may be a machine code, an interpretable code, or an intermediate code. In one aspect of the mechanisms, the compiler may determine a set of methods of the external component referenced by the computer program, and the program generator may use the determined set to determine the metadata to be extracted and combined with the program.

One aspect of the system is determining a minimal reference set of methods or type definitions based on the computer program. Metadata corresponding to the reference set may be included with the computer program. Metadata corresponding to methods or type definitions that are not referenced by the computer program may be excluded from the computer program. One feature of the minimal reference set is that it is sufficient to enable the computer program to execute in a system in which the assembly is not deployed. It may be greatly reduced in size from the entire metadata of the assembly. The assembly may have been generated from the external component prior to the actions of extracting metadata from the assembly.

In one aspect of the invention, a runtime manager may detect references to the external component, and perform actions to facilitate invocations of the external component. The runtime manager may retrieve metadata from the computer program and generate a types object that includes metadata to be used during runtime. The types object may also have program instructions to facilitate invoking external component methods, such as code to marshal arguments.

In one aspect of the invention, a runtime manager may create a unified types object that includes metadata from multiple assemblies. The runtime manager may receive metadata from each assembly, determine whether the received metadata is equivalent to metadata previously received from another assembly, and selectively store the metadata in the unified types object based on the equivalence. The unified types object may be used to invoke the external component by any of the assemblies, thereby avoiding the use of individual types objects corresponding to each assembly.

In one aspect of an implementation, in response to determining a reference to a type definition by an assembly, a runtime manager may generate an event, and an event handler may construct a type definition based on a unified types object.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention may become apparent from the following detailed description of the invention when considered in conjunction with the drawings.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

To assist in understanding the present invention, reference will be made to the following Detailed Description, which is to be read in association with the accompanying drawings, wherein.

DETAILED DESCRIPTION

Figure 1A:
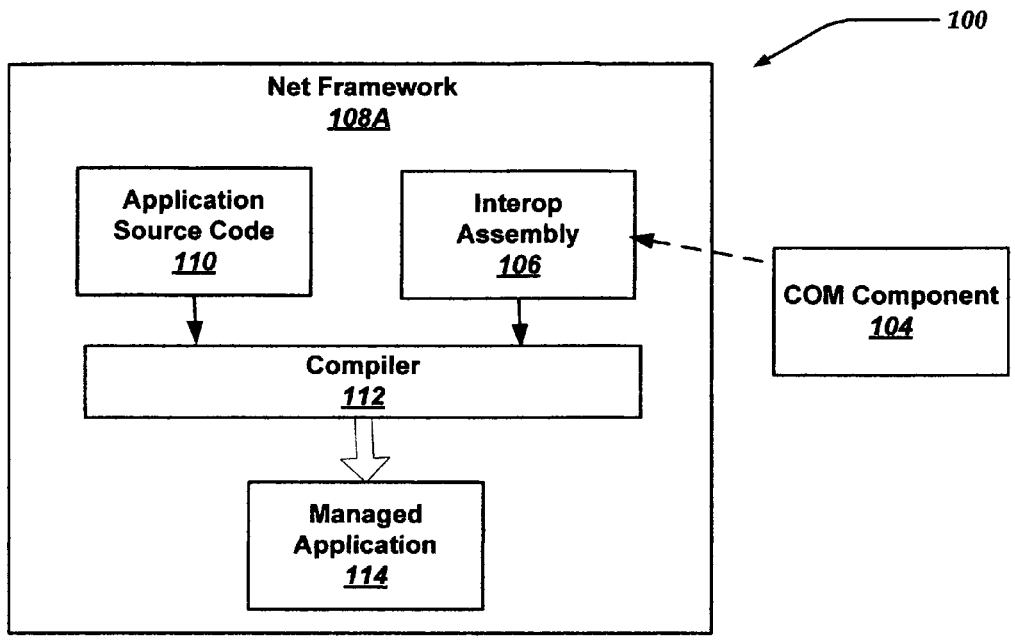
FIGS. 1A-B show a compile-time system and a run-time system enabling objects from two different architectures to interact.
Figure 1B:
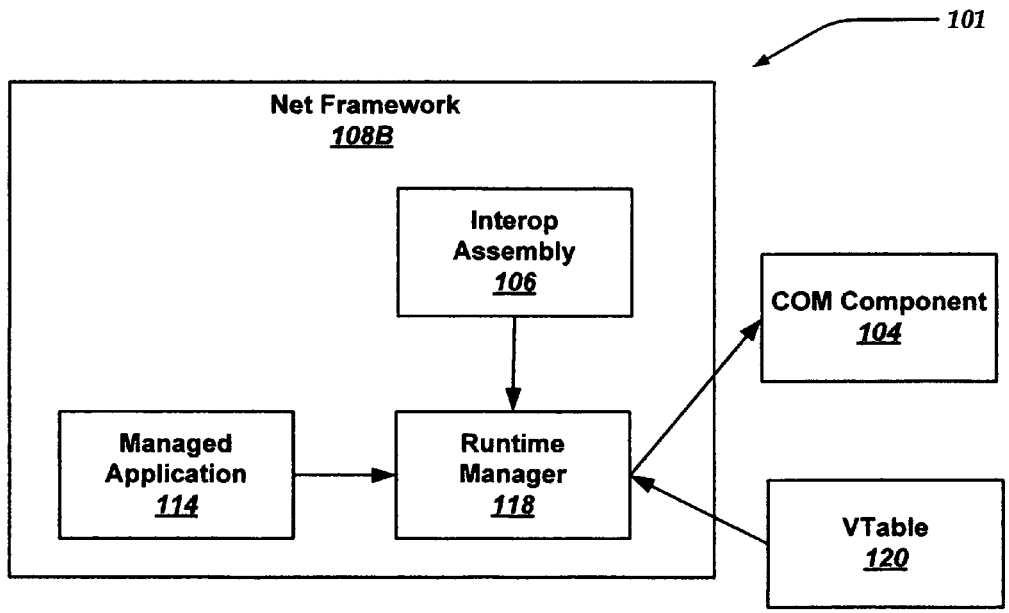

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention. Similarly, the phrase "in one implementation" as used herein does not necessarily refer to the same implementation, though it may.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

The components may execute from various computer readable media having various data structures thereon. The components may communicate via local or remote processes such as in accordance with a signal having one or more data packets (e.g. data from one component interacting with another component in a local system, distributed system, or across a network such as the Internet with other systems via the signal). Computer components may be stored, for example, on computer readable media including, but not limited to, an application specific integrated circuit (ASIC), compact disk (CD), digital versatile disk (DVD), read only memory (ROM), floppy disk, hard disk, electrically erasable programmable read only memory (EEPROM), flash memory, or a memory stick in accordance with embodiments of the present invention.

As used herein, the term "method" refers to a portion of code, associated with a class or an object, that performs a specific task, and can execute relatively independently of other methods. A method may, but does not necessarily, return a value. As used herein, the term method includes functions, procedures, or a subroutines.

A computer program refers to computer instructions representing logic for performing actions. A computer program may also include data. A computer program may have one or more representations, including source code and compiled code. A computer program may have one or more representations of compiled code, in that source code may be compiled to produce an intermediate compiled code which may be further compiled to produce executable code or other intermediate compiled code.

An application executable is a data object that includes program instructions, typically in a binary formatted file. Generally, the program instructions are a machine code and correspond to processor instructions, though the program instructions may be in another format that is emulated by a processing system. An application executable may include various types of data related to program instructions, such as symbols, debugging information, exception information, strings, resources or the like. A compilation system may produce a single executable file, or it may produce a primary executable file, one or more library files, or associated resource files. As used herein, the term application executable may include one or more executable files, associated files, or a combination thereof. An application executable may also be one or more memory blocks, objects in a database, or other forms of data. An application executable is a representation of a computer program.

Figure 2A:
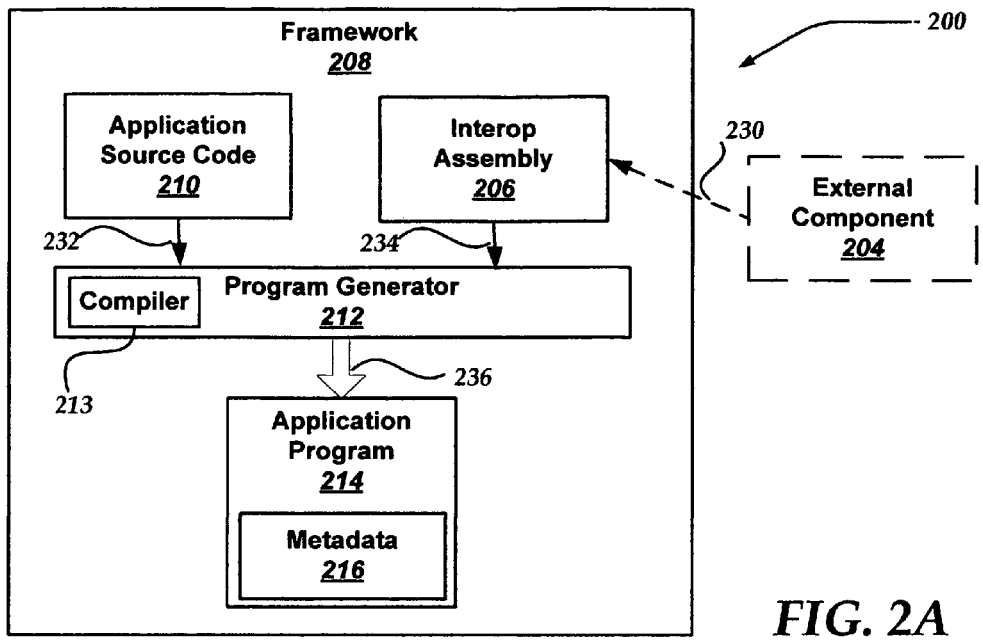
FIGS. 2A-B show one embodiment of a compile-time system and a run-time system enabling objects from two different architectures to interact, in accordance with mechanisms described herein.
Figure 2B:
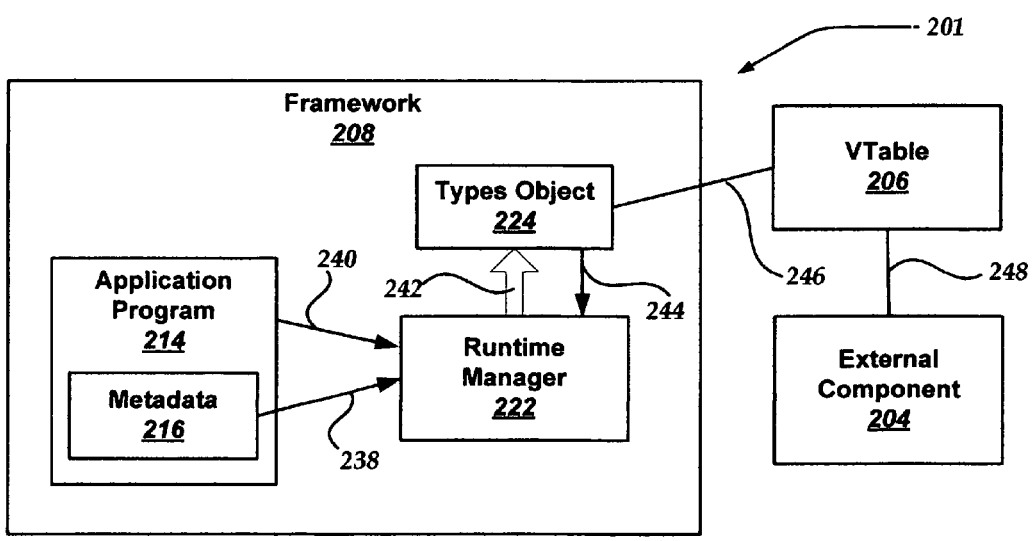

FIG. 2A is a block diagram of a compile-time system 200 in which an embodiment of the present invention may be employed. Framework 208 is an architecture that facilitates compilation and execution of programs or subprograms. Framework 208 may be an architecture such as the .NET Framework, by Microsoft Corporation, of Redmond, Wash., though mechanisms described herein are not so limited. In the illustrated embodiment, framework 208 includes interop assembly 206 and program generator 212. Interop assembly 206 includes metadata, such as type definitions, exposed by external component 204. Interop assembly 206 may include one or more files. External component 204 is a software component that is outside of the framework 208. It may, for example, adhere to the COM architecture, though it is not so limited. It may include one or more classes or objects, each having one or more methods. Interop assembly may employ a mechanism for authentication, such as a digital signature indicative of the provider of the assembly. External component 204 is not a part of the compile-time environment 200, but is shown in dashed lines to indicate a relation to compile time environment 200. External component 204 may be used as input by an external component compiler (not shown) to generate interop assembly 206 prior to compilation of application source code 210. Line 230 indicates that interop assembly 206 is derived from external component 204. As shown in FIG. 2B, external component 204 may also be used at runtime.

The metadata of interop assembly 206 may include type definitions and other data that may be used by program generator 212 to enable compilation of source code that references methods or data of external component 204. The metadata may also include data that may be used during runtime for enabling an application to invoke or reference external component 204. At least a portion of the metadata may represent an external interface corresponding to external component 204.

Application source code 210 includes source code of an application or subprogram, or a portion thereof. Application source code may include one or more files. Program generator 212 may be used to translate application source code 210 into an executable application program or subprogram. A subprogram may be a library, such as a dynamic linked library or other type of program library. Application program 214 may be such an application program or subprogram. As used herein, application program or computer program may refer to a computer program, subprogram, library, dynamic linked library, or other such units of computer programs. Program generator 212 may have logic for compiling a specific high level source language, such as C#, C++, VISUAL BASIC®, JAVA®, or the like. In one embodiment, program generator 212 may have logic for compiling an intermediate language. It may include a front end compiler that partially compiles a high level language, or it may receive an intermediate language from another component not shown in FIG. 2A.

Program generator 212 may include various subcomponents, such as a front end, a back end, an optimizer, an assembler, a linker, or the like. These subcomponents are represented in FIG. 2A by compiler 213. It may produce various intermediate files or data objects prior to generating application program 214. It may also retrieve and include various other files or data as part of its compilation actions.

In one embodiment, program generator 212 may perform actions to translate application source code 210 into compiled code to be included in application program 214. This may include various actions of a compiler, such as lexical analysis, syntactic analysis, semantic analysis, code generation, and code optimization, as well as linking code with code received from other components. The compiled code may be in a binary format with instructions native to a computer processor. Compiled code may be an intermediate language. In one embodiment, an intermediate language code may be further compiled immediately prior to execution.

In one embodiment, program generator 212 may determine external components that are referenced by application source code 210. It may further determine methods or data exposed by the referenced external components. For example, program generator 212 may determine, based on the content of application source code 210, that external component 204 is referenced. It may further determine a set of methods or data of component 204 that are referenced or otherwise needed by application program 214. In one embodiment, compiler 213 may flag methods or other references to external objects that are to be included in the set of methods or data for which corresponding metadata is to be retrieved. Program generator 212 may then use this information as discussed herein.

Program generator 212 may use the reference information to determine interop assemblies that are associated with the referenced external components. In the illustrated example, program generator 212 may determine that interop assembly 206 is associated with external component 204, which is referenced by application program 214.

Program generator 212 may extract, from interop assembly 206, metadata corresponding to external component 204, and merge the metadata into application program 214. In one embodiment, program generator 212 may employ services provided by the framework for accessing metadata of interop assembly 206. For example, the Microsoft .NET framework includes a set of reflection procedures that enable programmatic access to the metadata or other content of an assembly.

In one embodiment, a subset of the metadata that resides within interop assembly 206 is extracted and merged, wherein the subset includes a set of metadata corresponding to methods or data that are referenced by application program 214, or are otherwise needed by application program 214. In one embodiment, program generator 212 may determine a minimal set of metadata to extract and merge, based on references in the application source code 210. For each method referenced, program generator 212 may include metadata related to the method's signature. The signature of a method includes data such as the name of the method, the number, types, and order of its parameters, and the method's return type. The minimal set may exclude metadata corresponding to methods or data types that are not referenced by application source code 210. In one implementation, the excluded data may be represented in the embedded data by stubs, in order to maintain an accurate correspondence with referenced methods. For example, if application source code 210 references one method of external component 204, the minimal subset may include metadata corresponding to the referenced method, including input arguments and return values. As illustrated in FIG. 2A, application program 214 generated by program generator 212 includes metadata 216 that has been extracted and merged with the application program 214. The metadata 216 may include information that is sufficient to enable application program 214 or runtime manager 222 to instantiate external component 204, invoke any methods, or reference any data types of external component 204.

In one implementation, the metadata 216 is a local view of the metadata or, it may be said, the metadata is "local" to the application program 214. That is, it has a local scope such that it is only available for direct reference by the application program 214 in which it is embedded. Though not illustrated in FIGS. 2A or 2B, in a configuration in which a second application program references external component 204, the program generator may retrieve metadata from interop assembly 206 and embed it into the second application program, so that the second application program has its own local copy of the metadata. Depending on the particular references of the second program, its embedded metadata may be the same as or different from the embedded metadata 216 of the illustrated application program 214. Arrows 232 and 234 indicate that program generator 212 receives application source code 210 and interop assembly 206, respectively, as input. Arrow 236 indicates that program generator 212 generates application program 214, including metadata 216.

Interop assembly 206 may include program instructions in the form of source code or compiled code for facilitating invocation of external component 204. These may include, for example, instructions for marshalling method parameters, enabling return values, managing the call stack, or other operations. In accordance with the mechanisms described herein, it is not necessary to include these program instructions in application program 214. Thus, in one embodiment, program instructions from interop assembly 206 are not combined with the metadata 216 into application program 214. In one embodiment, program instructions from interop assembly 206 may be combined with metadata 216 into application program 214.

FIG. 2B is a block diagram of a runtime system 201, in which an embodiment of the present invention may be employed. Runtime system 201 corresponds to compile time system 200, and illustrates a runtime system that may exist subsequent to operation of the compilation system illustrated in FIG. 2A. Like numbered components in FIG. 2B represent like numbered components of FIG. 2A, and the discussion of these components with reference to FIG. 2A applies to FIG. 2B, unless indicated otherwise herein. Runtime system 201 and compile-time system 200 may be considered to be subsystems of a system for development and execution of computer programs.

Typically, runtime system 201 exists on a different computer system than compile-time system 200. Compile-time system 200 may be used with a development computer system, wherein runtime system 201 may be used with an end user computer system or a server computer system. The computer system of compile time system 200 may include various development tools, source code, and components such as interop assembly 206. The computer system of runtime system 201 typically does not have interop assembly 206 as well as other development tools and source code. In some embodiments, runtime system 201 may include the additional components of compile-time system 200. This may be the case, for example, during development and testing of programs.

As illustrated, runtime system 201 includes runtime manager 222. Runtime manager 222 includes one or more components that provide services for and manage the execution of, application program 214. This may include locating and loading class objects, handling references to objects and their methods, allocating memory, handling exceptions, managing security, or other runtime services. Arrow 240 illustrates that runtime manager 222 may receive various data or invocations from application program 214 during execution of application program 214.

In one implementation, runtime manager 222 may retrieve data (as shown by arrow 238) from metadata 216 and generate (as shown by arrow 242) a corresponding types object 224 with the data or a transformation thereof. Runtime manager 222 may also generate code and add the generated code to types object 224. This may include code to facilitate invocation of methods, such as instructions that marshal arguments, manipulate a runtime stack, store or retrieve data to or from registers, or the like. Each application program may have a corresponding types object. Runtime manager 222 may use types object 224 to facilitate interaction with external component 204. External component 204 may be used by one or more computer programs, including programs within framework 208 or programs external to framework 208.

During execution of application program 214, execution may reach a reference to external component 204. The reference may be an instantiation of an object or an invocation of a method. In response, runtime manager 222 may retrieve data (arrow 244) from types object 224 as needed to perform the desired operation. Runtime manager 222 may employ the retrieved data to perform the operation or pass control to types object 224 to perform operations facilitating interaction with external component 204. For example, invocation of a method may cause types object 224 to marshal arguments to be passed to the method, retrieve a pointer to the method within external component 204, and invoke the method. When the invoked method exits, types object 224 may process a returned value to facilitate handling by the calling program. In some implementations, runtime manager 222 may perform at least a portion of these actions.

Types object 224 may facilitate retrieving a pointer to the method within external component. In one implementation, types object may maintain references into vtable 206 (as shown by line 246), while vtable 206 maintains references into external component 204 (as shown by line 248). Upon request by runtime manager 222, types object may use these two levels of references to obtain a pointer into external component 204 and pass the pointer (as shown by arrow 244) to runtime manager 222.

It is to be noted that interop assembly 206 of FIG. 2A is excluded from FIG. 2B. In the illustrated embodiment, runtime references to external component 204 by application program 214 are handled without the use of interop assembly 206. The execution of application program 214 and external component 204 may be performed without having interop assembly installed on the host computer. Types object 224, which facilitates interaction with external component 204, may be generated by runtime manager 222 during execution of application program 214. Therefore, runtime system 201 does not need to have types object 224 deployed prior to or during execution of application program 214.

Compile-time system 200 and runtime system 201 are only examples of suitable systems and are not intended to suggest any limitation as to the scope of use or functionality of the present invention. Thus, a variety of system configurations may be employed without departing from the scope or spirit of the present invention. The components of compile-time system 200 and runtime system 201 are presented to show functional or logical aspects of the respective systems. However, these logical components may be implemented in a variety of ways. They may be implemented as separate software components or hardware and software combinations, integrated into a single component, or physically divided in a number of ways. Reference to each component herein refers to a logical component and includes the various configurations that may be used to implement the functionality discussed. They may be implemented on a single computing device or distributed among multiple computing devices in a variety of configurations.

A computing device may be a special purpose or general purpose computing device. Example computing devices include personal computers, portable computers, telephones, PDAs, servers, mainframes, consumer electronics, or the like. In brief, one embodiment of a computing device that may be employed includes one or more central processing units, a video display adapter, and a mass memory, all in communication with each other via a bus. Each processor may employ a chip multi-processing architecture (CMP), a symmetric multi-threading (SMT) architecture, or a chip multi-threading (CMT) architecture. Briefly, CMP refers to a processor architecture in which there are multiple processor cores per processor chip. SMT refers to a processor architecture in which a processor core has multiple hardware threads of execution. CMT refers to a processor architecture having multiple processor cores per processor chip and multiple hardware threads of execution per core.

The mass memory may include a random access memory (RAM), a read only memory (ROM), one or more permanent mass storage devices, removable media, or a combination thereof. Mass storage devices may include a hard disk drive, optical drive, flash memory, or a floppy disk drive. The mass memory may include a general-purpose operating system, application programs, security programs, communication programs, or other computer programs.

In a system including multiple computing devices, the computing devices may be directly connected or connected through a network, such as a local area network (LAN), wide area network (WAN), or other type of network. Each computing device may include a network interface component, modem, or other components for communicating with other computing devices.

Figure 3A:
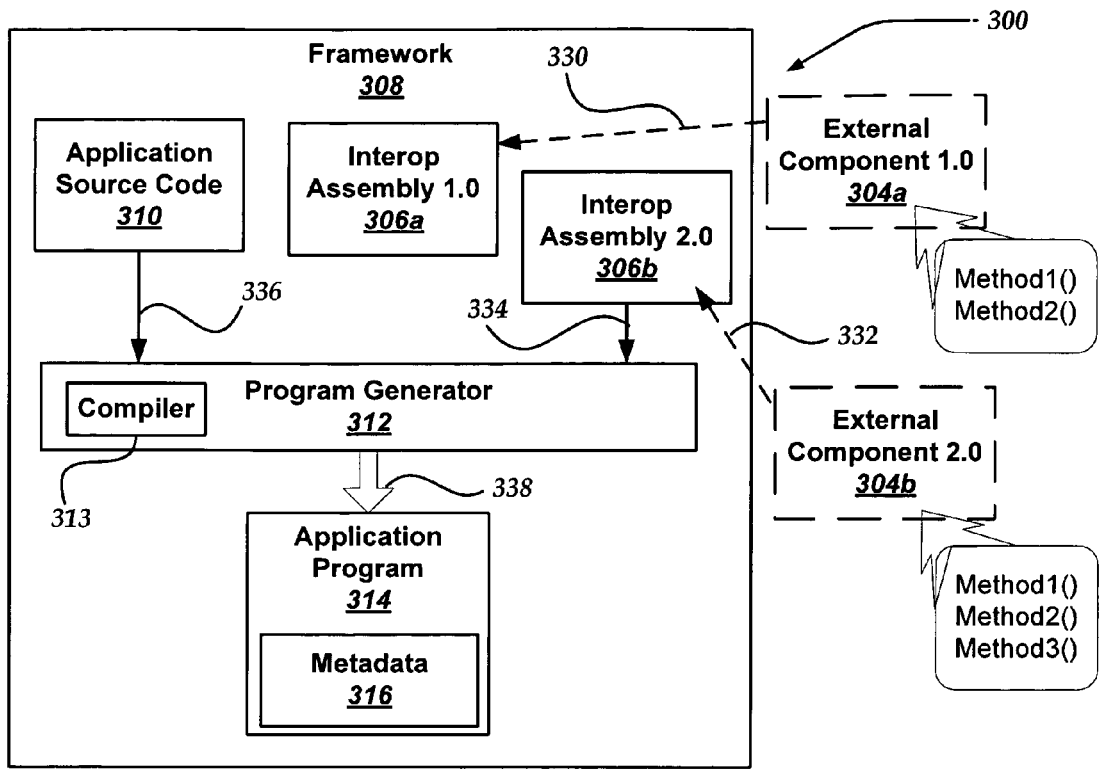
FIGS. 3A-C show one embodiment of a compile-time system and a run-time system enabling a computer program in a framework to interact with different versions of an external component, in accordance with mechanisms described herein.

FIG. 3A is a block diagram of a compile-time system 300 including framework 308. FIG. 3A includes multiple versions of an external component. Each version, for example, may be a version that is updated relative to prior versions. Some versions may not be updates, but may include features or characteristics different from another version. In FIG. 3A, versions of an external component are illustrated as external component 1.0 304*a* and external component 2.0 304*b*. As discussed for FIG. 2A, external components 304*a-b* are not part of the compile-time system 300, but are shown to illustrate their relationships to corresponding interop assemblies. Each external component 304*a-b* has a corresponding version of an interop assembly 306*a-b*. In one embodiment, interfaces of an external component may adhere to a rule that each version of the interface is a superset of previous versions. For example, a new method may be added to the interface, but a method is not deleted. If a method changes such that it requires a change of interface, the old method and interface is left unchanged, and a new method and corresponding interface is added with the desired changes.

FIG. 3A illustrates a compile-time system 300 in which multiple versions of interop objects exist. As illustrated in FIG. 3A, a first version of an external component 1.0 304*a* includes methods "method1( )" and "method2( )." A second version of the external component 2.0 304*b* has both of these methods and an additional method, "method3( )." Interop assembly 306*a* has been generated by an external component compiler (not shown) from external component 1.0 304*a* (as indicated by arrow 330). It has metadata pertaining to "method1( )" and "method2( )." Interop assembly 306*b* has been generated by an external component compiler (not shown) from external component 2.0 304*b* (as indicated by arrow 332). It has metadata pertaining to "method1( )," "method2( )," and "method3( )". Thus, interop assembly 306*a* and interop assembly 306*b* each present different external interfaces, and the interface of interop assembly 2.0 306*b* is a superset of the interface of interop assembly 1.0 306*a*.

A developer may specify which of the available interfaces are to be used when compiling the application source code 310. During compilation, program generator 312 uses the interop assembly having the specified interface. For example, if a developer has specified that the interface corresponding to interop assembly 306*b* is to be used (either explicitly or by indicating that the most recent one is to be used), the compilation process may extract metadata (as shown by arrow 334) from interop assembly 306*b*, in a manner as described in reference to FIG. 2A and elsewhere herein. Program generator 312 also receives as input (as shown by arrow 336) application source code 310. The metadata 316 may then be embedded in the application program 314, generated by program generator 312 (as shown by arrow 338). This enables the application program 314 to execute on a host computer system having external component 2.0 304*b* or a computer system having external component 1.0 304*a*, since it has the metadata for referencing either one.

Program generator 312 may be substantially similar to program generator 212 of FIG. 2. As illustrated, program generator 312 includes compiler 313, which may perform various actions of source code translation and code generation as described for program generator 212 and compiler 213 of FIG. 2.

Figure 3B:
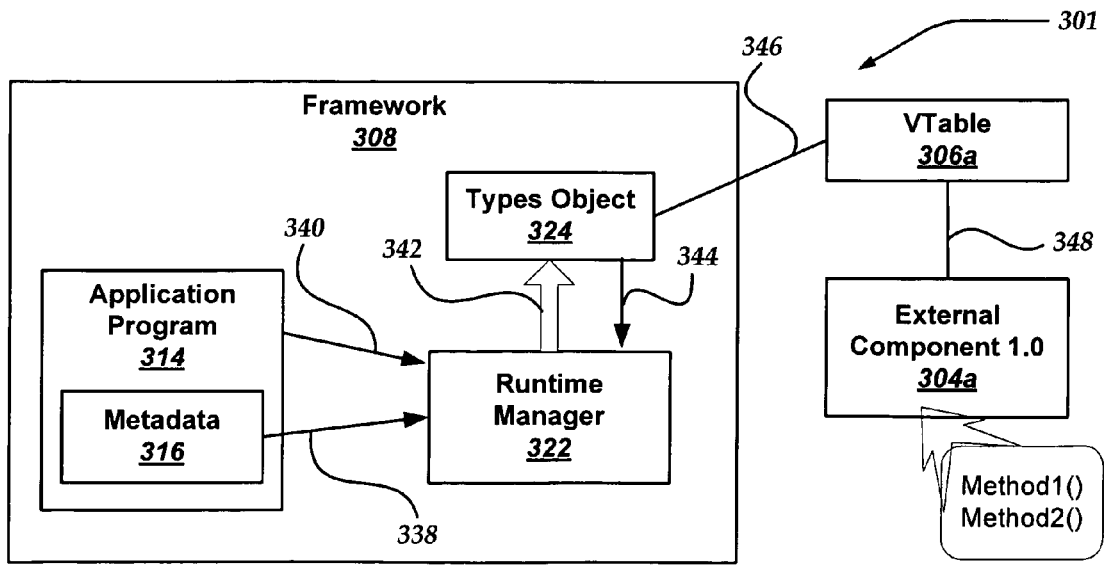

FIG. 3B illustrates a runtime system 301 that may be used to execute application program 314 as generated in the compile-time system 300 of FIG. 3A. In one implementation, runtime manager 322 may retrieve (arrow 338) metadata 316 and generate (arrow 342) types object 324, which enables interaction with external component 1.0 304*a* or 2.0 304*b*. During execution, runtime manager 322 receives data (arrow 340) from application program 314, as described in FIG. 2B. It may also retrieve data (arrow 344) from types object 324, such as a pointer to a method in external component 1.0 304*a*. Types object 324, in turn, may use its references (arrow 346) to vtable 306*a* and references (arrow 348) from vtable 306*a* to external component 1.0 304*a*, to determine pointers into external component 1.0 304*a*.

In runtime system 301, the host computer system includes external component 1.0 304*a* and does not include external component 2.0 304*b*. Application program 314, as compiled with interop assembly 306*b* in compile-time system 300, will not be enabled to invoke "method3( )." Application program 314 may handle this by having logic that determines whether the external component that is currently invoked includes "method 3," and performing actions based on its availability. For example, application program 314 may present a specific feature when executing on a host system in which external component 2.0 304*b* is active, and not present the feature when executing on a host system in which external component 2.0 304*b* is not active. A developer of application source code 310 may have documentation that describes differences between the versions, in order to include logic such as this.

Figure 3C:
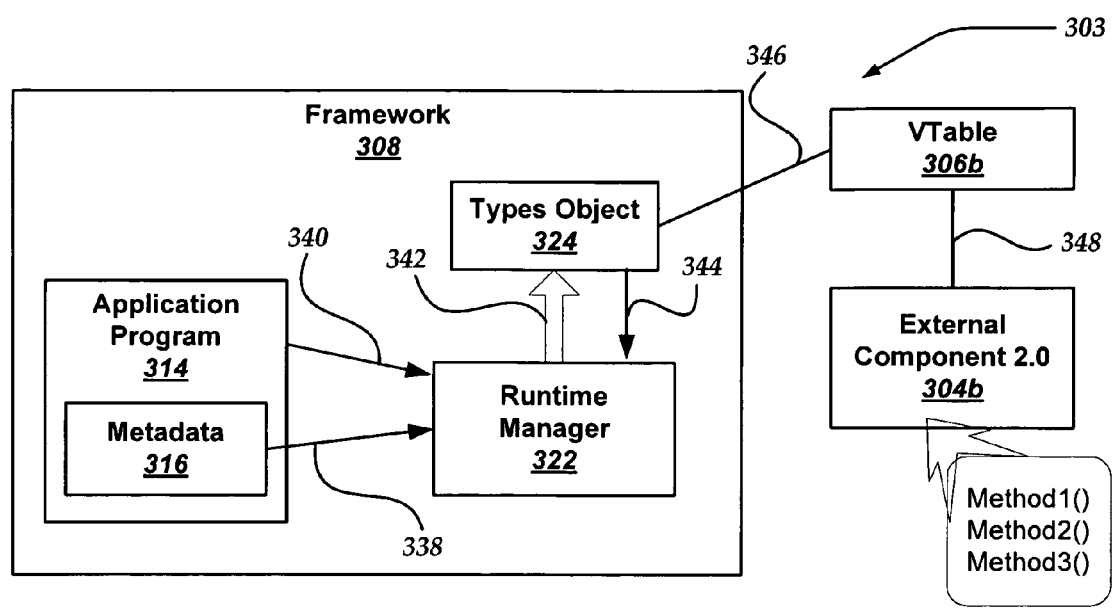

FIG. 3C illustrates a runtime system 303 that may be used to execute application program 314 as generated in the compile-time system 300 of FIG. 3A. Like numbered components in FIG. 3C represent like numbered components of FIG. 3B, and the discussion of these components with reference to FIG. 3B applies to FIG. 3C, unless indicated otherwise herein.

In runtime system 303, external component 2.0 304*b* is deployed on the host computer system, instead of external component 1.0 304*a* as in FIG. 3C. External component 2.0 304*b* has a corresponding vtable 306*b*. External component 2.0 304*b* implements "method1( )," "method2( )," and "method3( )." Therefore, unlike runtime system 301 of FIG. 3B, application program 314 may invoke "method3( )" in runtime system 303. Thus, FIGS. 3B-C together illustrated that an application program compiled with an interop assembly from a particular version of an external component may execute on a system with a previous version of the external component as well as on a system with the particular version.

Though not illustrated, in one embodiment, an application program may be compiled with an interop assembly from a particular version and execute with an external component of a subsequent version. However, the additions to the interface, as added subsequent to the particular version, will not be available to the application program even though they may be implemented in the newer version.

Figure 4:
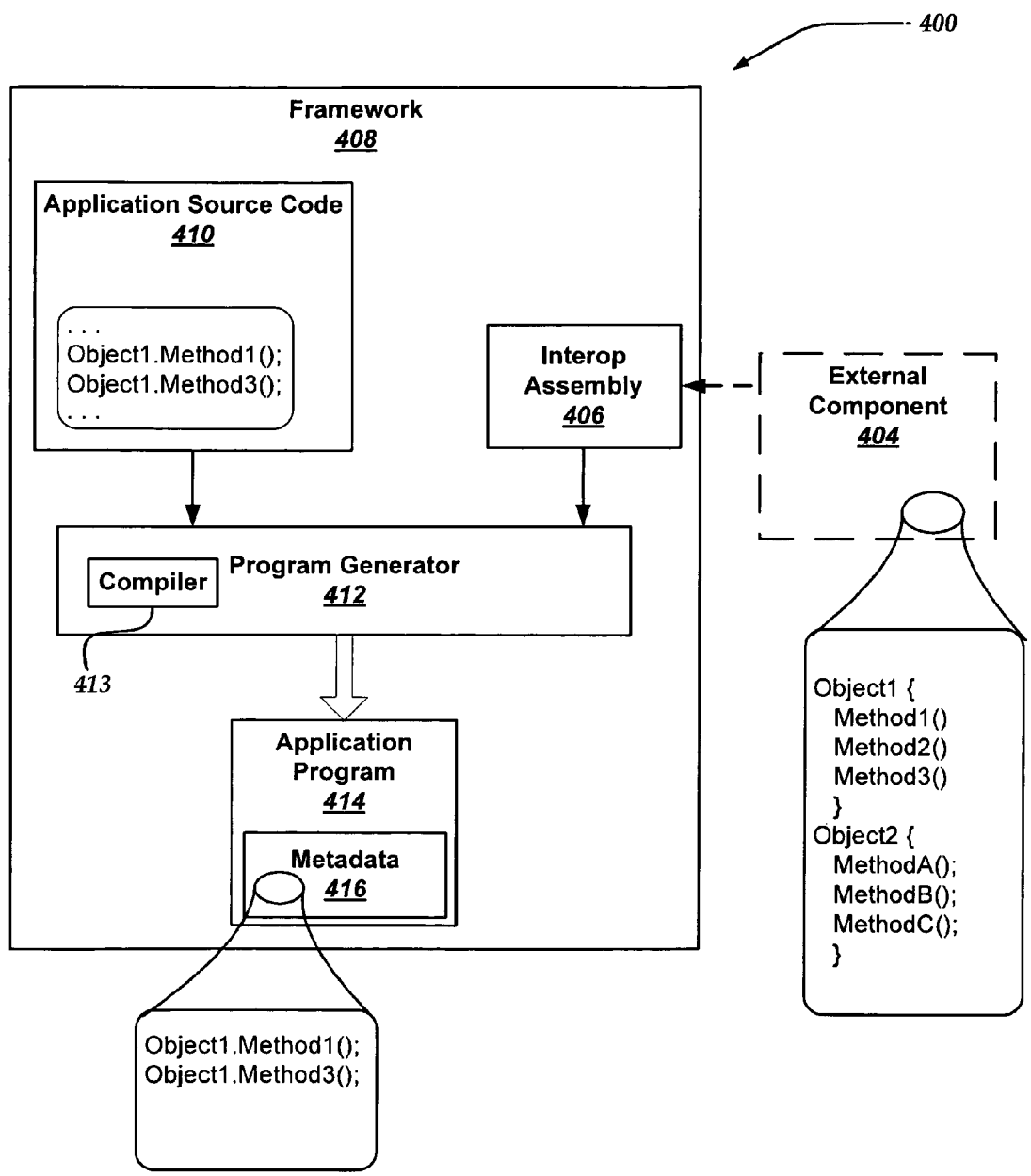
FIG. 4 show components of a compile-time system in which metadata is selectively used, in accordance with an embodiment of the mechanisms described herein.

FIG. 4 illustrates components of a compile-time system 400. Mechanisms related to compile-time system 400 are similar to mechanisms as described for FIGS. 2A and 3A, and are only selectively discussed herein. As illustrated, compile-time system 400 includes framework 408, which includes interop assembly 406, application source code 410, and program generator 412. Program generator 412 receives as input application source code 410 and interop assembly 406, and generates application program 414 with metadata 416 embedded therein. Though not included in compile-time system 400, external component 404 is compiled to generate interop assembly 406.

Program generator 412 may be substantially similar to program generator 212 of FIG. 2. As illustrated, program generator 412 includes compiler 413, which may perform various actions of source code translation and code generation as described for program generator 212 and compiler 213 of FIG. 2.

As illustrated, external component 404 defines object1, having method1( ), method2( ), and method3( ). It further defines object2, having methodA( ) and methodB( ). Metadata corresponding to each of these objects and methods may be included in interop assembly 406.

In one aspect of the mechanisms of compile-time system 400, program generator 412 may determine the methods and types that are referenced, directly or indirectly, by application source code 410. An indirect reference may include, for example, a type that is included within another referenced type. In one implementation, this set of references is the transient closure of references to the external object. This set of references may include types that are used in the signatures of methods that are referenced by application source code 410, such as arguments to the methods or return values. Program generator 412 may then selectively include metadata such as type definitions based on whether the metadata is referenced or otherwise needed to execute application program 414.

In the example illustration of FIG. 4, program generator 412 may determine that a set of referenced metadata includes object1, and methods method1( ) and method3( ) of object1. It may therefore embed metadata corresponding to this object and methods within metadata 416. It may exclude metadata corresponding to method2( ) of object one, as well as metadata corresponding to object2 and its methods. Thus, program generator 412 may automatically determine and embed a partial set of metadata into application program 414. In some configurations, this partial set may be considerably smaller than the complete set of metadata included in interop assembly 406. The partial set may exclude a remaining portion of metadata included in interop assembly 406, the remaining portion including type definitions or other metadata relating to types or methods not referenced by application program 414. During execution, a types object generated from application program 414 and metadata 416 may similarly selectively include metadata based on whether the metadata corresponds to the partial set. In some configurations, this may result in a considerable reduction in the amount of memory used to execute application program 414.

Figure 5:
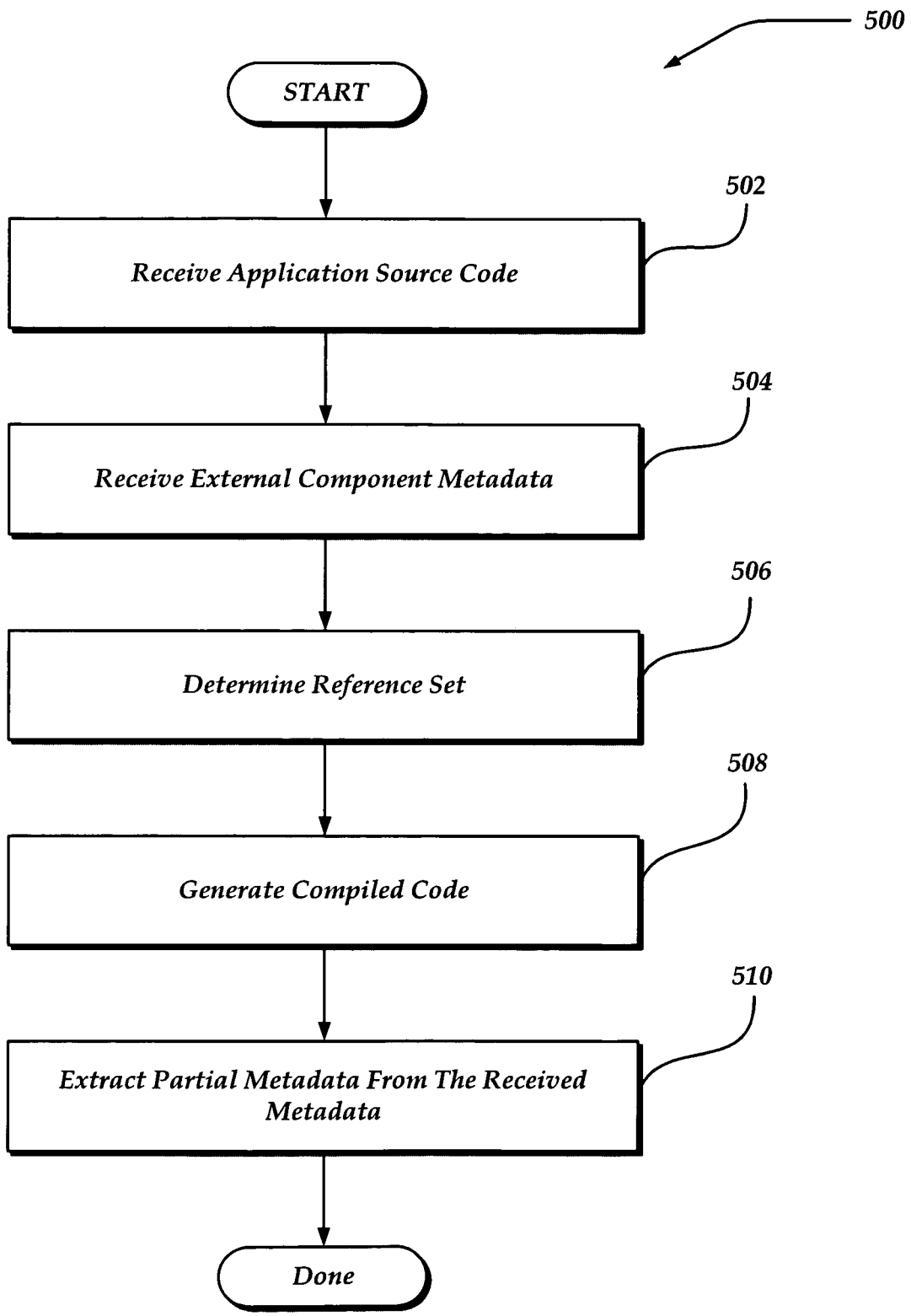
FIG. 5 is a logical flow diagram generally showing a process of generating a computer program, in accordance with an embodiment of the present invention.

FIG. 5 is a flow diagram illustrating a process 500 of generating an application program that employs one or more external components. Process 500 may be employed in a system in which an application program is a component of a first architecture and the one or more external components are components of a second architecture. Compile-time systems 200, 300, and 400 are examples of such systems, though process 500 may be employed in other systems. In one embodiment, a program generator, such as program generators 212, 312, or 412 of FIGS. 2, 3, or 4 respectively, may perform process 500, or a portion thereof.

Though not illustrated in FIG. 5, in one embodiment, prior to execution of process 500, an interop assembly may be generated. As discussed herein, an interop assembly may be generated by processing an external component.

Process 500 may begin, after a start block, at block 502, where application source code may be received. The application source code may be in the form of one or more files or data objects. The source code may be in any of a variety of computer languages, including low level languages or what is known as intermediate languages.

Process 500 may flow to block 504, where external component metadata may be received. As discussed herein, external component metadata may include typedefs, method signatures, or various other metadata that may be used during compilation or execution of a program that interacts with the external component. In one embodiment, the external component metadata is received from an interop assembly, as illustrated in compile-time systems 200, 300, or 400. It is to be noted that receiving the metadata at block 504 may mean receiving a pointer to the location of an assembly, and actual retrieval and processing of metadata may occur at a later time.

Process 500 may flow to block 506, where a reference set is automatically determined, based on the application source code or a translated representation thereof. More specifically, the reference set may be based on direct or indirect references to the external component. In one embodiment, the reference set may be determined based on the external component metadata. In particular, in one embodiment, references to the external component in the application source code may be selectively included in the reference set, based on whether the references correspond to the received external component metadata. This may represent, for example, methods, objects, types, or other specifications of an external interface corresponding to the external component.

In one embodiment, the application source code or a translated representation thereof is automatically processed to determine a minimal reference set. The minimal reference set may include the transient closure of references to the external component; it may exclude metadata that is not referenced by the application source code. In one embodiment, process 500 may determine a reference set that is substantially a minimal reference set. This may include a relatively small variation from a precise minimal reference set.

Process 500 may flow to block 508, where the application source code may be translated to a lower level code, referred to as compiled code. In various embodiments, the lower level code may be an intermediate language, a machine code, or an interpretable code. In one embodiment, an intermediate language code is further compiled immediately prior to execution. It is to be noted that translation of source code may be performed in one or more steps, and the various steps may be performed at various times during process 500. Some of the steps may be performed prior to process 500 or subsequent to process 500. However, translation is shown in block 508 for illustrative purposes.

Process 500 may flow to block 510, where metadata corresponding to the reference set is extracted from the received external component metadata. The amount of extracted metadata may range from the entire metadata to a very small subset of the metadata. At block 510, the extracted metadata may be combined with the lower level code generated at block 508. This may result in an application program such as application programs 214, 314, or 414, of FIGS. 2-4, respectively. The combination of code and metadata may be performed in a variety of ways, including embedding parts of the metadata at one or more locations within the code, appending the metadata to the code, or the like. The resultant application program may be one or more files or data objects. In one implementation, the metadata and the code may reside in separate files, but be combined in the sense that the combination of files is considered to be an application program.

Process 500 may flow to a done block and return to a calling program.

Figure 6:
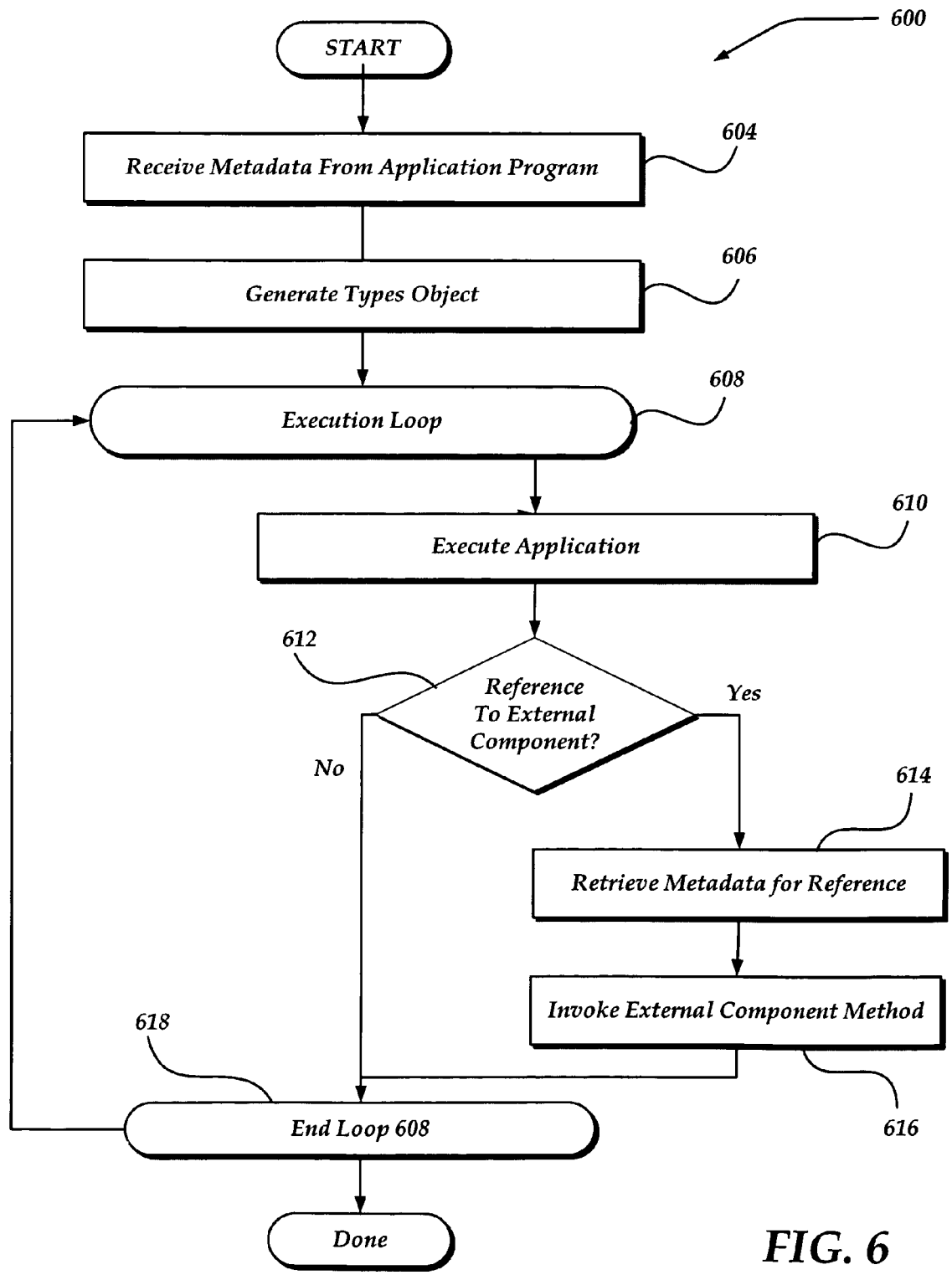
FIG. 6 is a logical flow diagram generally showing a process of facilitating an interaction of external components with a computer program, in accordance with an embodiment of the present invention.

FIG. 6 is a flow diagram illustrating a process 600 of facilitating an interaction of one or more external components with an application program. Process 600 may be employed in a system in which an application program is a component of a first architecture and the one or more external components are components of a second architecture. Runtime systems 201, 301, and 400 are examples of such systems, though process 600 may be employed in other systems. Process 600 may be employed with an application program that is produced as a result of performance of process 500.

Process 600 may begin after it is determined that an application is beginning, or is to begin, execution. This may be the result of a command or signal received from the operating system, from the application itself, or another component.

Process 600 may begin, after a start block, at block 604, where metadata is received from the application program, and specifically from the application executable. The metadata may include type information, location information, or other information that may be used to reference an external component. To clarify the discussion herein, the metadata received from the application program is referred to as application metadata.

Process 600 may flow to block 606, where a types object may be generated. The types object may be based on the application metadata. It may include all, or a portion of the application metadata. In one implementation, it includes a portion of the application metadata that is to be used to enable interaction with the external component. In one implementation, program instructions to facilitate invocation of methods or other interaction with the external component may be included in the types object.

It is to be noted that in a system having multiple application programs, process 600 may be performed for each application program, resulting in a types object corresponding to each application program, wherein differences between the types objects reflect corresponding differences between the application programs.

Process 600 may flow to block 608, where an execution loop begins, referred to herein as loop 608. In the illustration of process 600, blocks 610-616 are included within loop 608. Process 600 may flow to block 610, where a portion of the application program is executed. In various implementations, this may be performed by any of a number of techniques. In one implementation, control may be passed to an operating system to execute the application program until an interrupt, exception, or other change of control occurs. In one implementation, an interpreter may process and execute instructions of the application program. Other techniques may also be used to control execution of the application program.

Process 600 may flow to block 612, where a determination is made of whether a reference to an external component method by the application program is performed. If a reference is not being performed, process may flow to block 618, which terminates loop 610. Logic of loop 610 and its termination block 618 may cause the application program to execute indefinitely, until the program exits. Numerous actions may cause a program exit, including an explicit exit instruction, an exception, an operating system event, or other actions.

If, at block 612, it is determined that a reference to the external component is made, process 600 may flow to block 614, where the corresponding invocation metadata is determined and retrieved. This metadata may include information facilitating determining a location of the method, information facilitating marshalling of arguments, stack manipulation, register handling, or other runtime actions. These actions may include retrieving data from the types object corresponding to the application program. It may include retrieving data from a data structure, such as a vtable, that maintains location data of methods.

Process 600 may flow to block 616, where the referenced method of the external component is invoked. This may include, for example, passing execution control to the method of the external component.

Upon an exit of the external component method, process 600 may flow to block 618. As discussed above, block 618 terminates loop 610, and may cause process 600 to exit when the application program exits.

In one embodiment, in which multiple application programs are executing concurrently, multiple instances of process 600 may be performed, one corresponding to each application program. Each application may have a corresponding types object for each external component.

Figure 7:
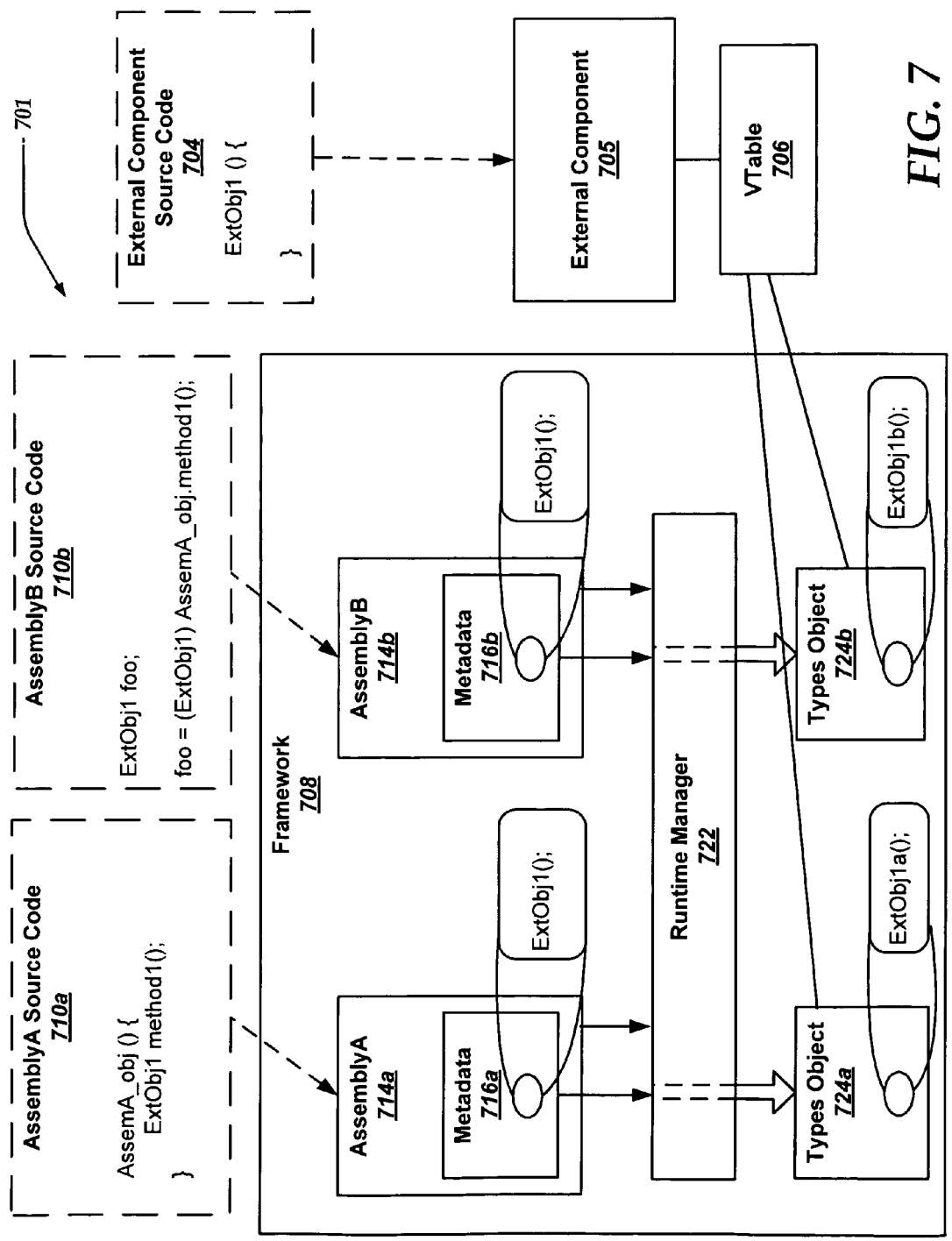
FIG. 7 is a block diagram of a run-time system enabling multiple assemblies from a framework to interact with an external component, in accordance with an embodiment of the mechanisms described herein.

FIG. 7 is a block diagram of a runtime system 701, in which an embodiment of the present invention may be employed. Runtime system 701 is similar to runtime system 201, and much of the discussion of runtime system 201 is applicable to runtime system 701. Runtime system 701, however, illustrates a system having two computer assemblies.

Though not part of the runtime system 701, FIG. 7 includes assembly A source code 710a and assembly B source code 710b, to illustrate source code that is compiled to produce assembly A 714a and assembly B 714b, respectively. Each of these assemblies may be generated in a manner as described herein, including embedding metadata 716a and 716b in respective assemblies. In one configuration, assembly A 714a and assembly B 714b may be subcomponents of a program, library, or other component. Each of assembly A source code 710a and assembly B source code 710b may include one or more modules or source files. FIG. 7 further includes external component source code 704, also not a part of the runtime system, which is used to produce external component 705.

As illustrated, runtime system 701 includes runtime manager 722. During runtime, runtime manager 722 may retrieve data from metadata 716a and 716b and generate respective types objects 724a and 724b, so that each of assemblies A 714a and B 714b has its own corresponding types object to facilitate interaction of external component 705. Thus, external component 705 may be used by both assembly A 714a and assembly B 714b, concurrently, as well as by other assemblies within framework 708 or outside of framework 708. The components of runtime system 701 may perform substantially similarly to corresponding components illustrated in FIG. 2A and described herein.

As illustrated, external component source code 704 includes a definition of an object, "ExtObj1." Assembly A defines an object with a method that returns a value of type ExtObj1, as illustrated in assembly A source code 710a. Assembly B creates a variable "foo" of type ExtObj1. Assembly B also invokes assembly A's method "method1," and assigns the return value to the variable foo, as can be seen in assembly source code 710b.

Metadata 716a, embedded in 714a, and metadata 716b, embedded in 714b, each include data descriptive of the ExtObj1 as defined in external component source code 704. However, during runtime, runtime manager 722 retrieves metadata 716a to generate types object 724a. It also retrieves metadata 716b from assembly 714b to generate types object 724b. Each of the type definitions in types object 724a are viewed as distinct from corresponding type definitions in types object 724b. In one implementation, when an assignment of corresponding types is performed, runtime manager 722 may perform actions to manipulate the object being assigned into a form that is equivalent to the receiving assignee. In the illustrated example, this may include performing manipulations of ExtObj1b, though the manipulations may not be necessary. In one implementation, this type of assignment may be disallowed, or a runtime exception may be triggered.

Figure 8:
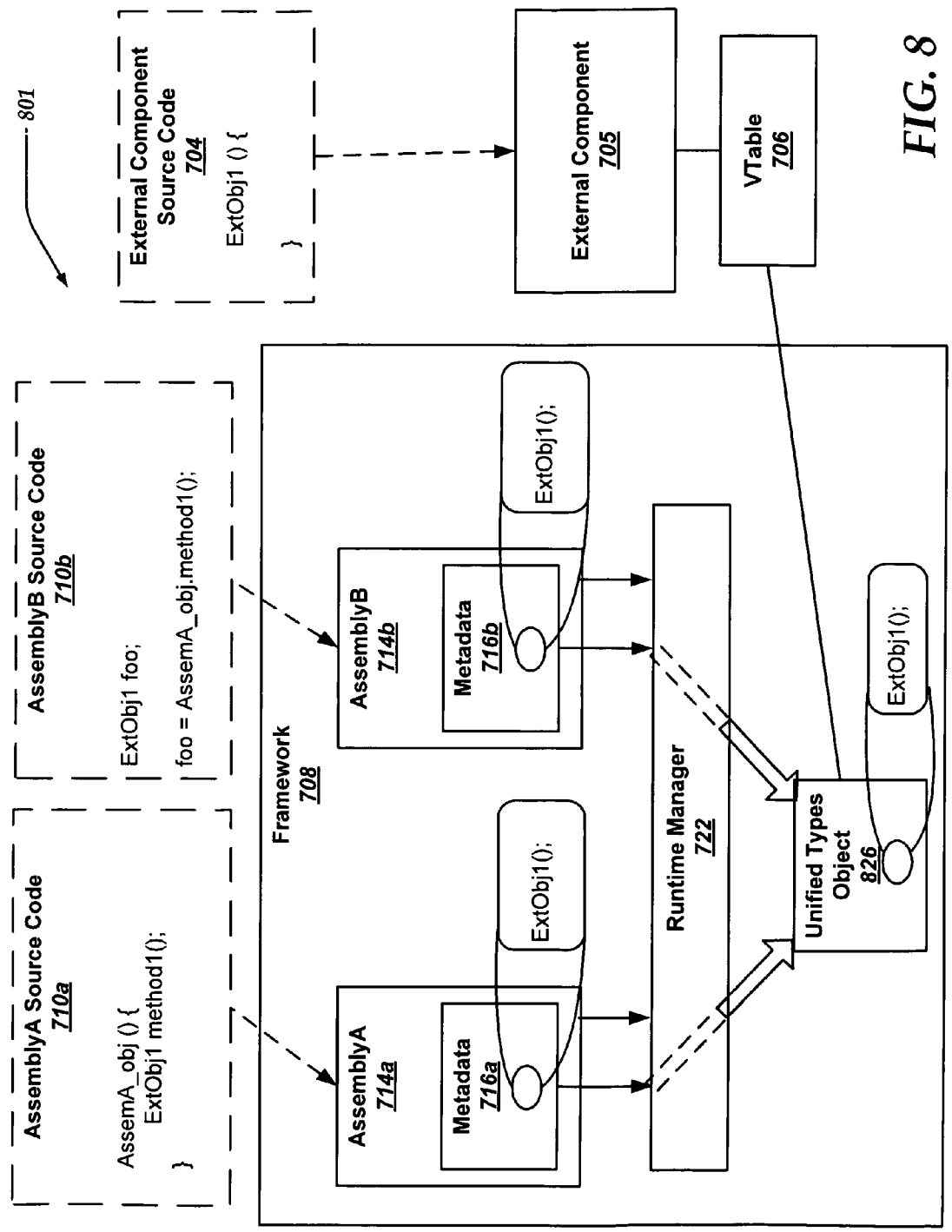
FIG. 8 is a block diagram of a run-time system enabling multiple assemblies from a framework to interact with an external component by using a unified types object, in accordance with an embodiment of the mechanisms described herein.

FIG. 8 is block diagram illustrating runtime system 801, which is a variation of runtime system 701 of FIG. 7. Like numbered components of FIG. 8 represent like numbered components of FIG. 7 and the discussion of these components with reference to FIG. 7 applies to FIG. 8, unless indicated otherwise herein.

In runtime system 801, runtime manager 722 generates a unified types object 826, which includes type definitions from both metadata 716a of assembly A 714a and metadata 716b of assembly B 714b. The metadata from each assembly is merged, so that a unified entry is created for each item that is common to both assemblies. In the illustrated example, an entry for ExtObj1 is inserted into the unified types object 826. This entry corresponds to both assemblies 714a and 714b. In one implementation, runtime manager 722 recognizes a common type definition by its GUID or other identifier. In one implementation, a type identifier may be specified in source code for each type, so that a common type identifier indicates types that are to be considered identical types, even if they are in different assemblies. A type identifier may be a string, a number, or another format of identifier. Type definitions from different assemblies having equivalent identifiers are considered to be a reference to the same type.

Runtime manager 722 may then use unified types object 826 to facilitate interaction with external component 705 in a way similar to types object 224 of FIG. 2B, but its use is not limited to a single assembly. Rather, unified types object 826 may be used with both assembly A 714a and with assembly B 714b, whether the respective references are to the same type or different types.

For example, during execution of assembly A 714a, execution may reach a reference to external component 705. The reference may be an instantiation of an object or an invocation of a method. In response, runtime manager 722 may retrieve data from unified types object 826 as needed to perform the desired operation. Runtime manager 722 may employ the retrieved data to perform the operation or pass control to unified types object 826 to perform operations facilitating interaction with external component 705. For example, invocation of a method may cause unified types object 826 to marshal arguments to be passed to the method, retrieve a pointer to the method within external component 705, and invoke the method. When the invoked method exits, unified types object 826 may process a returned value to facilitate handling by the calling program. In some implementations, runtime manager 722 may perform at least a portion of these actions.

A reference to external component 705 by assembly B 714b may be handled similarly. References by both assembly A 714a and assembly B 714B may be handled concurrently by runtime manager 722 and unified types object 826.

Though FIG. 8 illustrates only two assemblies, a unified types object may be employed with any number of assemblies. In one implementation, type definitions in a unified types object may be deleted when all assemblies that reference it are no longer active. In one implementation, unreferenced type definitions may remain in the unified types object, available for reference by an assembly that becomes active.

Figure 9:
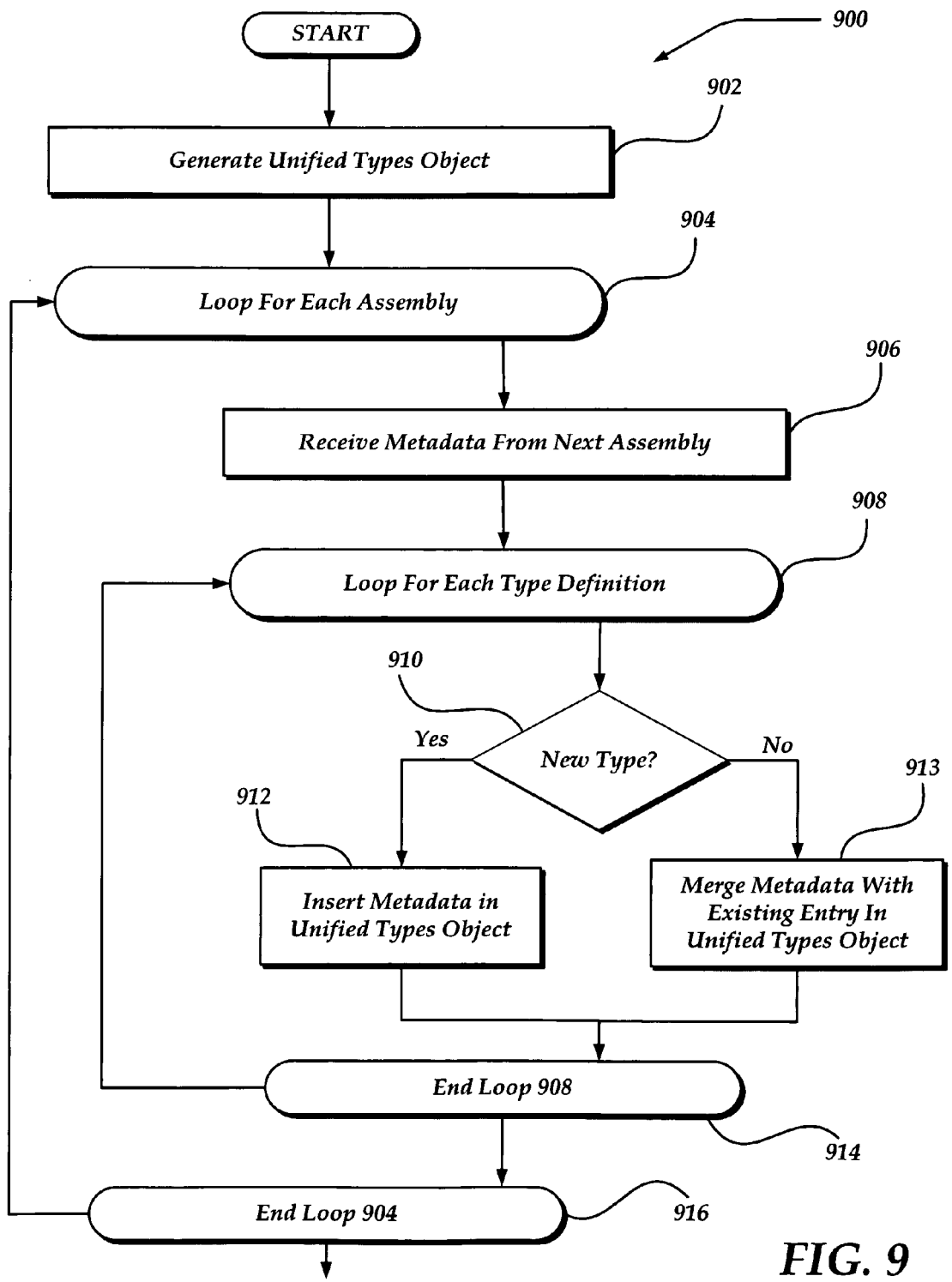
FIG. 9 is a logical flow diagram generally showing a process of creating a unified types object to facilitate an interaction of multiple assemblies with external components, in accordance with an embodiment of the mechanisms described herein.

FIG. 9 is a flow diagram illustrating a process 900 of creating and populating a unified types object for multiple assemblies. Process 900 may be employed in a system in which one or more assemblies are components of a first architecture and one or more external components are components of a second architecture. Runtime system 801 is an example of such a system, though process 900 may be employed in other systems.

Process 900 may begin after it is determined that an assembly is beginning, or is to begin, execution. It may begin upon activation of a runtime manager, such as runtime manager 722 of FIG. 8.

Process 900 may begin, after a start block, at block 902, where a unified types object, such as unified types object 826, is generated. This may include initialization, such as creation of one or more data structures. The process may flow to block 904, where a loop begins, referred to herein as loop 904. In one implementation, each iteration of the loop corresponds to an instance of an assembly that is activated in the system. Process 900 may flow to block 906, where metadata from a next assembly is received. This may be a first assembly or a subsequent assembly. The metadata may include all, or a portion of the assembly's metadata. In one implementation, it includes a portion of the assembly metadata that is to be used to enable interaction with the external component. In one implementation, program instructions to facilitate invocation of methods or other interaction with the external component may be included in the unified types object.

Process 900 may flow to block 908, where an inner loop begins, referred to herein as inner loop 908. Inner loop 908 may iterate over each type definition included in the received metadata of the assembly.

Within inner loop 908, process 900 may flow to block 910, where a determination is made of whether the type definition is a new unique type definition, or it is identical to a previously processed type definition. As discussed herein, the uniqueness of a type definition may be determined by a GUID, a user specification, or another identifier. If it is determined that the type definition is new, the process may flow to block 912, where a new entry corresponding to the type definition is created in the unified types object, and corresponding metadata is stored. The process may flow to block 914.

If, at decision block 910, it is determined that the type definition matches an existing entry in the unified types object, the existing entry corresponding to the type definition may be used by the current assembly, and the process may flow from block 910 to block 913. The current assembly may have metadata that is the same or differs from the metadata already existing in the entry, as provided by a previous entry. For example, a method may have more than one signature, and the current assembly may provide a definition for a signature that differs from a signature provided from a previous assembly. In one implementation, the metadata from the two different signatures may be merged into the same entry in the unified types object. In one implementation, metadata from two different signatures may be placed in different entries in the unified types object, rather than merged into a single entry. In some configurations, the metadata from the current assembly may be equivalent to existing metadata from a previous assembly, and merging metadata at block 913 may be skipped. Thus, an entry corresponding to a type definition may be shared by more than one assembly when subsequently referencing the type during execution. The process may flow from block 913 to block 914.

Block 914 terminates inner loop 908. Inner block 908 may exit when all type definitions of the current assembly are processed, or due to other logic. Process 900 may flow to block 916, which terminates loop 904. In one implementation, loop 904 may continue indefinitely, blocking while waiting for a new assembly. It may exit when runtime manager 722 exits, or based on other logic.

Process 900 may then exit or return to a calling program.

Figure 10:
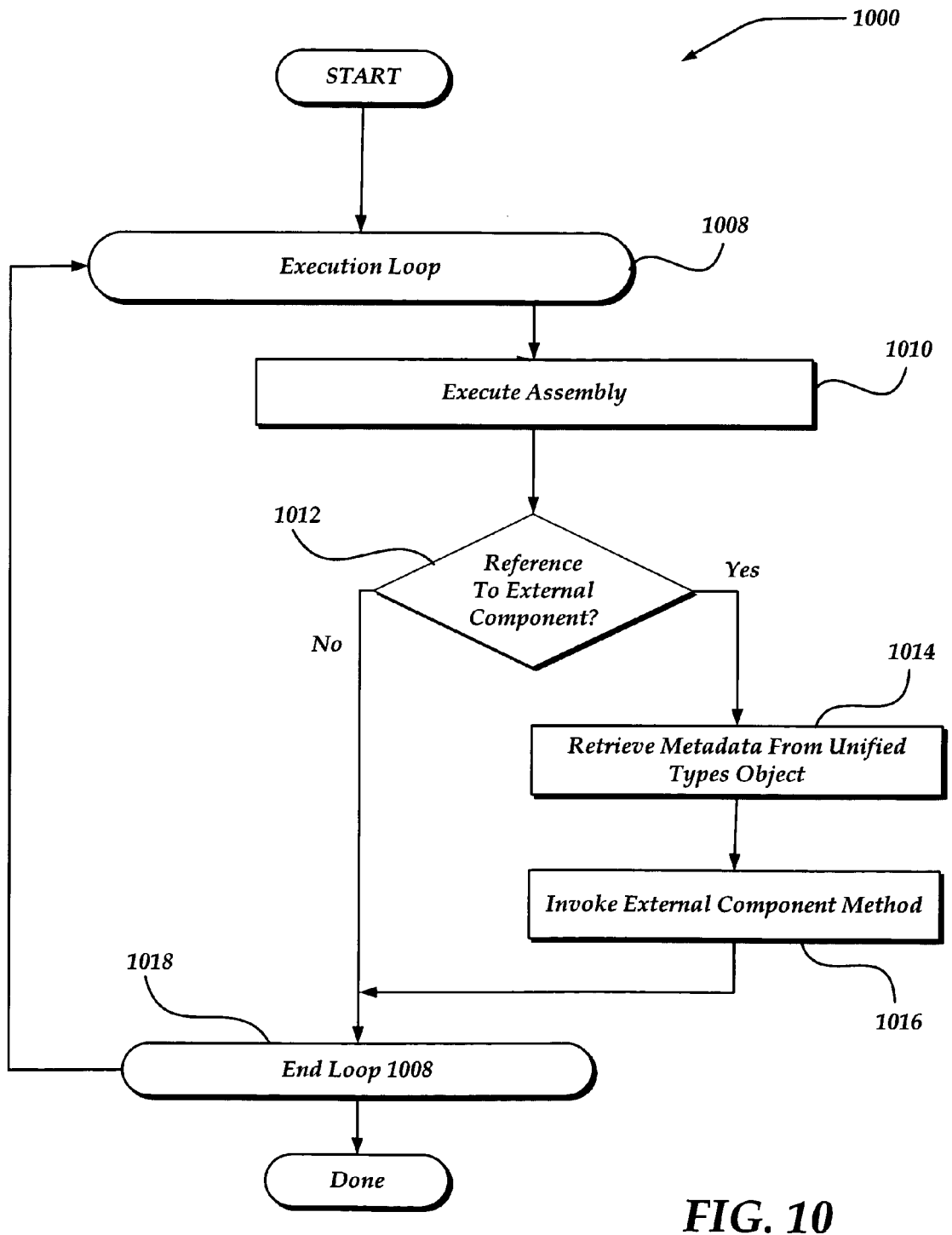
FIG. 10 is a logical flow diagram generally showing a process of employing a unified types object to facilitate an interaction of multiple assemblies with external components, in accordance with an embodiment of the mechanisms described herein.

After metadata of an assembly, or a portion thereof, is stored in the unified types object 826, runtime manager 722 may use the metadata to facilitate the corresponding assembly to interact with the external component. FIG. 10 is a flow diagram illustrating a process 1000 of facilitating interaction of one or more assemblies with an external component. Process 600 may be performed in the various systems in which process 900 may be performed. Process 600 may be performed for an assembly after inner loop 908 of process 900 has been performed at least for an iteration corresponding to a type definition to be used for an invocation or other reference of the external component.

Process 1000 may begin, after a start block, at block 1008, where an execution loop begins, referred to herein as loop 1008. In the illustration of process 1000, blocks 1010-1016 are included within loop 1008. Process 1000 may flow to block 1010, where a portion of an assembly is executed. In FIG. 8, the assembly may be either one of assembly A 714a or assembly B 714b. In various implementations, this may be performed by any of a number of techniques. In one implementation, control may be passed to an operating system to execute the application program until an interrupt, exception, or other change of control occurs. In one implementation, an interpreter may process and execute instructions of the application program. Other techniques may also be used to control execution of the assembly.

Process 1000 may flow to block 1012, where a determination is made of whether a reference to an external component method by the assembly is performed. If a reference is not being performed, process may flow to block 1018, which terminates loop 1010. Logic of loop 1010 and its termination block 1018 may cause the assembly to execute indefinitely, until the program exits. Numerous actions may cause an assembly exit, including an explicit exit instruction, an exception, an operating system event, or other actions.

If, at block 1012, it is determined that a reference to the external component is made, process 1000 may flow to block 1014, where the corresponding invocation metadata is determined and retrieved. This metadata may include information facilitating determining a location of the method, information facilitating marshaling of arguments, stack manipulation, register handling, or other runtime actions. These actions may include retrieving data from unified types object 826, of FIG. 8. It may include retrieving data from a data structure, such as vtable 706, that maintains location data of methods.

Process 1000 may flow to block 1016, where the referenced method of the external component is invoked. This may include, for example, passing execution control to the method of the external component.

Upon an exit of the external component method, process 1000 may flow to block 1018. As discussed above, block 1018 terminates loop 1010, and may cause process 1000 to exit based upon program logic.

As illustrated in FIG. 10, each iteration of execution loop 1008 corresponds to execution of a portion of an assembly that shares a unified types object. Thus, execution of more than one assembly may be interleaved in a variety of ways. In one implementation, multiple instances of loop 1008 may be performed in corresponding threads, each thread corresponding to one corresponding assembly or to multiple assemblies, such that concurrent execution of multiple assemblies may be performed. In one implementation, a multithreaded assembly may have multiple threads of execution loop 1008.

In various embodiments, a unified types object may be implemented in any of a number of ways. In one implementation, when the runtime manager determines that a reference to requires retrieval of a type definition, it may first determine whether the reference has previously been resolved. If it has not been resolved, the runtime manager may cause a specified event to be raised. In one implementation, the reference that triggered the action may be passed as a parameter to the event handler. An event handler may retrieve the corresponding metadata from the unified types object, dynamically construct a type definition, and return the type definition based on the original reference. These actions may occur as part of, or in conjunction with, the actions of block 1014.

It will be understood that each block of the flowchart illustrations of FIGS. 5-6, 9-10, and combinations of blocks in the flowchart illustrations, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustrations may also be performed concurrently with other blocks or combinations of blocks, or even in a different sequence than illustrated without departing from the scope or spirit of the invention.

The above specification, examples, and data provide a complete description of the manufacture and use of the composition of the invention. Since many embodiments of the invention can be made without departing from the spirit and scope of the invention, the invention resides in the claims hereinafter appended

What is claimed as new and desired to be protected by Letters Patent of the United States is:

1. A computer-implemented method for enabling a plurality of computer assemblies in a framework to reference an external component outside of the framework, comprising, at runtime of at least one of the plurality of computer assemblies:

receiving items of metadata corresponding to the external component from each of the plurality of computer assemblies, each item of metadata being descriptive of at least one signature of at least one method;

selectively storing, in a unified types object, each item of received metadata, based on whether the item of metadata was previously received from another computer assembly of the plurality of computer assemblies, wherein selectively storing includes:

receiving a type definition corresponding to each signature of the at least one signature;

determining whether each type definition matches a previously received type definition; and in response to determining that a received type definition matches a previously received type definition, merging metadata corresponding to the received type definition with the metadata corresponding to the previously received type definition;

in response to determining an invocation of the external component by one of the plurality of computer assemblies, employing the stored items of metadata in the unified types object to facilitate invoking the external component; and storing computer instructions in the unified types object and in response to determining the invocation of the external component, passing control to the unified types object, the unified types object performing at least one of marshaling of arguments, call stack manipulation, or register handling.

2. The method of claim 1, further comprising determining whether a first item of metadata received from a first assembly of the plurality of computer assemblies is identical to a second item of metadata received from a second assembly of the plurality of computer assemblies based on a first globally unique identifier associated with the first item of metadata and a second globally unique identifier associated with the second item of metadata; and wherein selectively storing the second item of metadata in the unified types object is based on the determination of whether the first item of metadata is identical to the second item of metadata.

3. The method of claim 1, further comprising determining whether a first item of metadata received from a first assembly of the plurality of computer assemblies is identical to a second item of metadata received from a second assembly of the plurality of computer assemblies based on an identifier associated with each of the first item of metadata and the second item of metadata, each identifier specified in source code corresponding to each of the first and second assemblies.

4. The method of claim 1, wherein the framework is a managed framework, each of the plurality of assemblies is a managed assembly, and the external component executes outside of the managed framework.

5. The method of claim 1, wherein employing the stored metadata comprising:
   detecting a type reference and, in response, causing an event to be raised; and
   enabling an event handler to, in response to the raised event, retrieve at least a portion of the stored metadata and return a type definition corresponding to the invocation.

6. The method of claim 1, further comprising maintaining the unified types object and selectively deleting a portion of the items of metadata from the unified types object based on whether assemblies corresponding to each item of metadata are active.

7. The method of claim 1, wherein determining whether each type definition matches the previously received type definition includes determining whether a first method signature received from a first computer assembly corresponds to a second method signature previously received by a second assembly.

8. A hardware computer-readable storage medium having stored thereon computer program instructions for enabling a first assembly and a second assembly in a framework to interact with an external component outside of the framework, the program instructions executable by one or more processors to perform actions including:
   receiving a first metadata from the first assembly;
   receiving a second metadata from the second assembly;
   storing the first metadata in a unified types object;
   in response to that a first type definition corresponding to the first metadata matches a second type definition corresponding to the second metadata, merging the second metadata with the first metadata in the unified types object; and
   employing the unified types object to facilitate interaction with the external component by each of the first and second assemblies.

9. The hardware computer-readable storage medium of claim 8, wherein the actions further include determining an invocation of the external component by each of the first and second assemblies and employing the extracted metadata to facilitate invocation of the external component by each of the first and second assemblies.

10. The hardware computer-readable storage medium of claim 8, wherein the actions further include inserting, into the unified types object, program instructions for facilitating invocation of methods referenced by each of the first and second assemblies.

11. The hardware computer-readable storage medium of claim 8, wherein the actions further include employing the unified types object to facilitate invocation of a method in the first assembly by the second assembly by performing at least one action of call stack manipulation or register handling.

12. The hardware computer-readable storage medium of claim 8, wherein the first metadata has a scope local to the first assembly and the second metadata has a scope that is local to the second assembly.

13. The hardware computer-readable storage medium of claim 8, wherein the actions further include in response to that the first type definition is a new unique type definition, creating a new entry in the unified types object and storing the first metadata in the new entry.

14. The hardware computer-readable storage medium of claim 8, wherein the actions further include employing the first metadata and a pointer in the unified types object, in combination with a vtable, to locate a first version of a method in the external component when the first version is available and a second version of the method when the second version is available.

15. A computer-based system for enabling a plurality of assemblies in a framework to interoperate with an external component outside of the framework, comprising:
   a processor and a memory coupled to the processor, the memory containing instructions that are executable by the processor to cause the processor to perform actions including:
      creating an object that includes metadata from each of the plurality of assemblies, at least a portion of the metadata shared by at least two of the plurality of assemblies; and
      employing the object to facilitate invocation of the external component by each of the plurality of assemblies and invocation at least one of the assemblies by at least one other one of the assemblies, facilitating invocation of the external component comprising performing at least one action selected from the group of actions consisting of marshaling of arguments, call stack manipulation, or register handling; and
   wherein each metadata is descriptive of a corresponding signature of a corresponding method, and wherein the actions performed by the processor further include:
      receiving a type definition corresponding to each signature;
      determining whether each type definition matches a previously received type definition; and
      in response to determining that a received type definition matches a previously received type definition, merging metadata corresponding to the received type definition with metadata corresponding to the previously received type definition.

16. The system of claim 15, wherein the actions performed by the processor further include resolving a reference to a type definition by generating an event and enabling an event handler to provide the type definition based on the object.

17. The computer-based system of claim 15, wherein the actions further include employing a first metadata and a pointer in the object, in combination with a vtable, to locate a first version of a method in an external component when the first version is available and a second version of the method when the second version is available.

18. The computer-based system of claim 15, wherein determining whether each type definition matches a previously received type definition includes:

determining whether a first item of metadata received from a first assembly of the plurality of assemblies is identical to a second item of metadata received from a second assembly of the plurality of assemblies based on a first globally unique identifier associated with the first item of metadata and a second globally unique identifier associated with the second item of metadata.

\* \* \* \* \*